United States Patent
Perkins et al.

(10) Patent No.: US 10,127,205 B2
(45) Date of Patent: Nov. 13, 2018

(54) METHODS AND COMPUTING DEVICE FOR GENERATING MARKUP LANGUAGE TO REPRESENT A CALCULATION RELATIONSHIP

(71) Applicant: WORKIVA INC., Ames, IA (US)

(72) Inventors: Andrew Perkins, Bozeman, MT (US); Susan Yount, Washington, DC (US); Herman Fischer, Woodland Hills, CA (US); Dean Anthony Ritz, Edmonds, WA (US)

(73) Assignee: Workiva Inc., Ames, IA (US)

( * ) Notice: Subject to any disclaimer, the term of this patent is extended or adjusted under 35 U.S.C. 154(b) by 0 days.

(21) Appl. No.: 15/603,947

(22) Filed: May 24, 2017

(65) Prior Publication Data

US 2017/0344524 A1 Nov. 30, 2017

Related U.S. Application Data

(60) Provisional application No. 62/341,213, filed on May 25, 2016.

(51) Int. Cl.
*G06F 17/00* (2006.01)
*G06F 17/22* (2006.01)
*G06F 17/21* (2006.01)
*G06F 17/27* (2006.01)

(52) U.S. Cl.
CPC ........ *G06F 17/2247* (2013.01); *G06F 17/218* (2013.01); *G06F 17/2765* (2013.01)

(58) Field of Classification Search
CPC .............. G06F 17/2247; G06F 17/245–17/246
See application file for complete search history.

(56) References Cited

U.S. PATENT DOCUMENTS 8,601,367 B1 * 12/2013 Ritz ...................... G06Q 10/00
715/234
8,825,614 B1 * 9/2014 Haila .................. G06F 17/2288
707/695

(Continued)

OTHER PUBLICATIONS

XBRL 2.1 Specification, Recommendation Dec. 31, 2003 with errata corrections to Feb. 20, 2013, http://www.xbrl.org/Specification/XBRL-2.1/REC-2003-12-31/XBRL-2.1-REC-2003-12-31+corrected-errata-2013-02-20.html.*

*Primary Examiner* — Scott T Baderman
*Assistant Examiner* — Matthew G McVicker
(74) *Attorney, Agent, or Firm* — Drinker Biddle & Reath LLP

(57) ABSTRACT

A computing device parses markup language of an instance document (e.g., an XBRL instance document) that contains a plurality of facts, in which each fact comprises a value that is tagged according to at least one concept of a plurality of concepts. A taxonomy document contains markup language that defines one or more relationships among the plurality of concepts. Based on the parsing of the markup language of the instance document, the computing device determines that at least two of the plurality of facts are in a calculation relationship with one another. The computing device then generates markup language representing the calculation relationships (e.g., XLink) and modifies the taxonomy document (e.g., modifies or extends a linkbase contained in the taxonomy document) with the generated markup language.

25 Claims, 12 Drawing Sheets

| cell | value | period | balance | concept | unit | scenario |
|---|---|---|---|---|---|---|
| F1 | 890 | 2016-01-01 2016-03-31 | debit | Revenue | USD | Country:USA |
| F2 | 170 | 2016-01-01 2016-03-31 | debit | Revenue | USD | Country:Canada |
| F3 | 230 | 2016-01-01 2016-03-31 | debit | Revenue | USD | Country:Mexico |
| F4 | 1,290 | 2016-01-01 2016-03-31 | debit | Revenue | USD | |

(56) References Cited

U.S. PATENT DOCUMENTS

| | | | | |
|---|---|---|---|---|
| 2005/0102212 | A1* | 5/2005 | Roy | G06Q 10/10 |
| | | | | 705/36 R |
| 2006/0206878 | A1* | 9/2006 | Uchida | G06F 8/73 |
| | | | | 717/139 |
| 2007/0162362 | A1* | 7/2007 | Yamagishi | G06Q 40/12 |
| | | | | 705/30 |
| 2008/0201157 | A1* | 8/2008 | McNamar | G06Q 10/10 |
| | | | | 705/1.1 |
| 2008/0250157 | A1* | 10/2008 | Ohata | G06Q 10/10 |
| | | | | 709/236 |
| 2009/0019358 | A1* | 1/2009 | Blake | G06F 17/2247 |
| | | | | 715/234 |
| 2012/0011118 | A1* | 1/2012 | Gleicher | G06F 17/2235 |
| | | | | 707/736 |
| 2013/0018923 | A1* | 1/2013 | Ferris | G06F 17/3092 |
| | | | | 707/803 |
| 2014/0013204 | A1* | 1/2014 | Theis | G06F 17/24 |
| | | | | 715/234 |

* cited by examiner

600 ↘  ╭─602  ╭─604

|   | C | D |
|---|---|---|
| 1 | Account Balance (period start) | $896 ◄─606 |
| 2 | Additions | $27 |
| 3 | Depletions | -$17 |
| 4 | Account Balance (period end) | $906 |

| cell | value | period | balance | concept | unit | scenario |
|---|---|---|---|---|---|---|
| D1 | 896 | 2015-12-31 | credit | AccountBalance | USD | |
| D2 | 27 | 2016-01-01 2016-03-31 | credit | AccountAdditions | USD | |
| D3 | 17 | 2016-01-01 2016-03-31 | debit | AccountDepletions | USD | |
| D4 | 906 | 2016-03-31 | credit | AccountBalance | USD | |

|   | E | F |
|---|---|---|
| 1 | USA | $890 |
| 2 | Canada | $170 |
| 3 | Mexico | $230 |
| 4 | TOTAL | $1,290 |

FIG. 7B

|   | E | F |
|---|---|---|
| 1 | USA | $890 |
| 2 | Canada | $170 |
| 3 | Mexico | $230 |
| 4 | TOTAL | =sum(B1:B3) |

FIG. 7C

| cell | value | period | balance | concept | unit | scenario |
|---|---|---|---|---|---|---|
| F1 | 890 | 2016-01-01 2016-03-31 | debit | Revenue | USD | Country:USA |
| F2 | 170 | 2016-01-01 2016-03-31 | debit | Revenue | USD | Country:Canada |
| F3 | 230 | 2016-01-01 2016-03-31 | debit | Revenue | USD | Country:Mexico |
| F4 | 1,290 | 2016-01-01 2016-03-31 | debit | Revenue | USD |  |

800

```
<linkbase xsi:schemaLocation="http://www.xbrl.org/2003/linkbase http://www.xbrl.org/
2003/xbrl-linkbase-2003-12-31.xsd" xmlns="http://www.xbrl.org/2003/linkbase"
xmlns:xlink="http://www.w3.org/1999/xlink" xmlns:xsi="http://www.w3.org/2001/
XMLSchema-instance", xmlns:ecalc="http://www.xbrl.org/2016/linkbase">

<explicitCalculationLink xlink:role="http://www.somecompany.com/role/
PropertyAndEquipmentGross" xlink:type="extended">

<loc xlink:href="instancedoc.xml#Fact-1"
            xlink:label="loc_Fact-1" xlink:type="locator" />
        <loc xlink:href="instancedoc.xml#Fact-2"
            xlink:label="loc_Fact-2" xlink:type="locator" />
        <loc xlink:href="instancedoc.xml#Fact-3"
            xlink:label="loc_Fact-3" xlink:type="locator" />
        <loc xlink:href="instancedoc.xml#Fact-4"
            xlink:label="loc_Fact-4" xlink:type="locator" />
        <loc xlink:href="instancedoc.xml#Fact-5"
            xlink:label="loc_Fact-5" xlink:type="locator" />
        <loc xlink:href="instancedoc.xml#Fact-6"
            xlink:label="loc_Fact-6" xlink:type="locator" />

<explicitCalculationArc order="1" weight="1"
            xlink:arcrole="http://www.xbrl.org/2003/arcrole/summation-item"
            xlink:from="instancedoc.xml#Fact-1"
            xlink:to="loc_Fact-2" xlink:type="arc" />
        <explicitCalculationArc order="1" weight="1"
            xlink:arcrole="http://www.xbrl.org/2003/arcrole/summation-item"
            xlink:from="instancedoc.xml#Fact-1"
            xlink:to="loc_Fact-3" xlink:type="arc" />
        <explicitCalculationArc order="1" weight="1"
            xlink:arcrole="http://www.xbrl.org/2003/arcrole/summation-item"
            xlink:from="instancedoc.xml#Fact-4"
            xlink:to="loc_Fact-5" xlink:type="arc" />
        <explicitCalculationArc order="1" weight="1"
            xlink:arcrole="http://www.xbrl.org/2003/arcrole/summation-item"
            xlink:from="instancedoc.xml#Fact-4"
            xlink:to="loc_Fact-6" xlink:type="arc" />

</explicitCalculationLink>
</linkbase>
```

FIG. 8

```xml
<?xml version="1.0" encoding="US-ASCII"?>
<xbrli:xbrl xmlns:abcc="http://www.abcco.com/20130331" xmlns:xbrli="http://www.xbrl.org/2003/
instance" xmlns:xlink="http://www.w3.org/1999/xlink" xmlns:xsd="http://www.w3.org/2001/
XMLSchema" xmlns:xsi="http://www.w3.org/2001/XMLSchema-instance">
        <link:schemaRef xlink:href="abcc-20130331.xsd" xlink:type="simple" />
        <xbrli:context id="FI2015Q4">
                <xbrli:entity>
                        <xbrli:identifier scheme="http://www.sec.gov/CIK">1234567890</xbrli:identifier>
                </xbrli:entity>
                <xbrli:period>
                        <xbrli:instant>2015-12-31</xbrli:instant>
                </xbrli:period>
        </xbrli:context>
        <xbrli:context id="FD2016Q1QTD">
                <xbrli:entity>
                        <xbrli:identifier scheme="http://www.sec.gov/CIK">1234567890</xbrli:identifier>
                </xbrli:entity>
                <xbrli:period>
                        <xbrli:startDate>2016-01-01</xbrli:startDate>
                        <xbrli:endDate>2016-03-31</xbrli:endDate>
                </xbrli:period>
        </xbrli:context>
        <xbrli:context id="FI2016Q1">
                <xbrli:entity>
                        <xbrli:identifier scheme="http://www.sec.gov/CIK">1234567890</xbrli:identifier>
                </xbrli:entity>
                <xbrli:period>
                        <xbrli:instant>2016-03-31</xbrli:instant>
                </xbrli:period>
        </xbrli:context>
        <xbrli:unit id="usd">
                <xbrli:measure>iso4217:USD</xbrli:measure>
        </xbrli:unit>
        <abcc:AccountAdditions contextRef="FD2016Q1QTD" decimals="0" id="Fact-0002" unitRef="usd">27</abcc:AccountAdditions>
        <abcc:AccountBalance contextRef="FI2015Q4" decimals="0" id="Fact-0001" unitRef="usd">896</abcc:AccountBalance>
        <abcc:AccountBalance contextRef="FI2016Q1" decimals="0" id="Fact-0004" unitRef="usd">906</abcc:AccountBalance>
        <abcc:AccountDepletions contextRef="FD2016Q1QTD" decimals="0" id="Fact-0003" unitRef="usd">17</abcc:AccountDepletions>
</xbrli:xbrl>
```

```
<linkbase xsi:schemaLocation="http://www.xbrl.org/2003/linkbase http://www.xbrl.org/2003/xbrl-linkbase-
2003-12-31.xsd" xmlns="http://www.xbrl.org/2003/linkbase" xmlns:xlink="http://www.w3.org/1999/xlink"
xmlns:xsi="http://www.w3.org/2001/XMLSchema-instance", xmlns:ecalc="http://www.xbrl.org/2016/
linkbase">
    <explicitCalculationLink xlink:role="http://www.abcco.com/role/ChangeInBalance"
xlink:type="extended">
        <loc xlink:href="instancedoc.xml#Fact-0001" xlink:label="loc_Fact-0001" xlink:type="locator" />
        <loc xlink:href="instancedoc.xml#Fact-0002" xlink:label="loc_Fact-0002" xlink:type="locator" />
        <loc xlink:href="instancedoc.xml#Fact-0003" xlink:label="loc_Fact-0003" xlink:type="locator" />
        <loc xlink:href="instancedoc.xml#Fact-0004" xlink:label="loc_Fact-0004" xlink:type="locator" />
        <explicitCalculationArc order="1" weight="1" xlink:arcrole="http://www.xbrl.org/2003/arcrole/
summation-item" xlink:from="instancedoc.xml#Fact-0004" xlink:to="loc_Fact-0001" xlink:type="arc" />
        <explicitCalculationArc order="2" weight="1" xlink:arcrole="http://www.xbrl.org/2003/arcrole/
summation-item" xlink:from="instancedoc.xml#Fact-0004" xlink:to="loc_Fact-0002" xlink:type="arc" />
        <explicitCalculationArc order="3" weight="-1" xlink:arcrole="http://www.xbrl.org/2003/arcrole/
summation-item" xlink:from="instancedoc.xml#Fact-0004" xlink:to="loc_Fact-0003" xlink:type="arc" />
    </explicitCalculationLink>
</linkbase>
```

1102a (pointing to loc elements)
1102b (pointing to explicitCalculationArc elements)

FIG. 11

METHODS AND COMPUTING DEVICE FOR GENERATING MARKUP LANGUAGE TO REPRESENT A CALCULATION RELATIONSHIP

CROSS-REFERENCE TO RELATED APPLICATIONS

This application claims the priority benefit of U.S. Provisional Patent Application No. 62/341,213, filed May 25, 2016 and incorporated herein by reference.

TECHNICAL FIELD

Embodiments disclosed herein generally relate to managing markup language documents, and, more specifically, to methods and a computing device for generating markup language to represent a calculation relationship.

BACKGROUND

Computer-readable markup languages predate the World Wide Web ("WWW"), but the WWW was the initial driver for the increased popularity of markup languages—starting with presentation-oriented markup languages, like the HyperText Markup Language ("HTML"), and eventually leading to the widespread use of content-oriented markup languages, like the eXtensible Markup Language ("XML"). One such content-oriented markup language is the eXtensible Business Reporting Language ("XBRL"). XBRL allows businesses to communicate efficiently and accurately with each other, with investors, and with regulatory agencies. Using XBRL, a company can associate tags with data (e.g., values) in the company's financial statements. This process, commonly called "tagging," supplies additional information about the data being tagged (sometimes referred to as "metadata"). The information can then be searched, reorganized for analytical purposes, and processed into human readable formats such as graphs, spreadsheets, or other tabular renderings. XBRL can be integrated with HyperText Markup Language in the form of inline XBRL ("iXBRL").

Reports (e.g., financial statements) that publicly-held companies file with the United States Securities and Exchange Commission ("SEC"), are required to be tagged with metadata that conforms to XBRL. XBRL tagging is therefore a key part of the financial statement production process. The SEC requirements, covering interactive data reporting using XBRL, provide prescribed ways to represent data and its metadata, including rules about how the two should be associated.

Among the metadata represented in an XBRL taxonomy is a concept-based calculation relationship, which defines an arithmetic relationship between specified, appropriate metadata "tags." For example, an taxonomy (which is typically set forth in one or more sections of XML and/or XML Linking language ("XLink")) may contain a calculation relationship asserting that a value tagged with the concept "Assets" ("fact Assets") should equal the sum of the values tagged with concepts "Current Assets" and "Noncurrent Assets," respectively. Tagged values ("facts") whose concept tags are referenced in a calculation relationship can be validated by an XBRL processor (software that is capable of reading and interpreting XBRL). For example, given facts for Assets, Current Assets, and Noncurrent Assets, and the example relationship above, an XBRL processor can validate the fact Assets by verifying that its value is consistent with the summation of facts Current Assets and Noncurrent Assets. The result of this validation is either a confirmation that fact Assets is "consistent" with the processor-calculated value, or that fact Assets is "inconsistent" with the processor-calculated value. Detection of inconsistencies prior to delivery of XBRL-formatted statements is an important step in improving the accuracy of these statements, thus reducing the chance that a restatement of information and correction is required at a later date. Further, data consumers (e.g., shareholders, regulatory agencies, or members of the public) also benefit from being able to confirm these same consistencies.

Currently, there are semantically valid arithmetic relationships and/or combinations of XBRL facts that are often used in financial report, but which currently cannot be represented in a concept-based calculation relationship in the most recently-adopted version of XBRL. In effect, there is a gap between what kinds of calculation relationships XBRL covers and what kinds of relationships users of XBRL need it to cover. Thus, users of XBRL currently have only partial risk mitigation to the problem of calculation inconsistencies.

DRAWINGS

While the appended claims set forth the features of the present techniques with particularity, these techniques may be best understood from the following detailed description taken in conjunction with the accompanying drawings.

FIG. 6A illustrates a report with values based on an example set of facts.

FIG. 6B is a table of the facts represented by the values of the report of FIG. 6A.

FIG. 7A and FIG. 7B illustrate a report with values based on an example set of facts.

FIG. 7C is a table of the facts represented by the values of the report of FIG. 7A and FIG. 7B.

FIG. 8 shows XBRL code that implements one possible syntactical approach for representing a fact-based calculation relationship within a linkbase document, according to an embodiment.

FIG. 10 shows an example of an instance document, from which the values shown in the report 600 of FIG. 6A were derived.

FIG. 11 shows a taxonomy document containing a linkbase that has been extended according to an embodiment.

DETAILED DESCRIPTION

Figure 1:
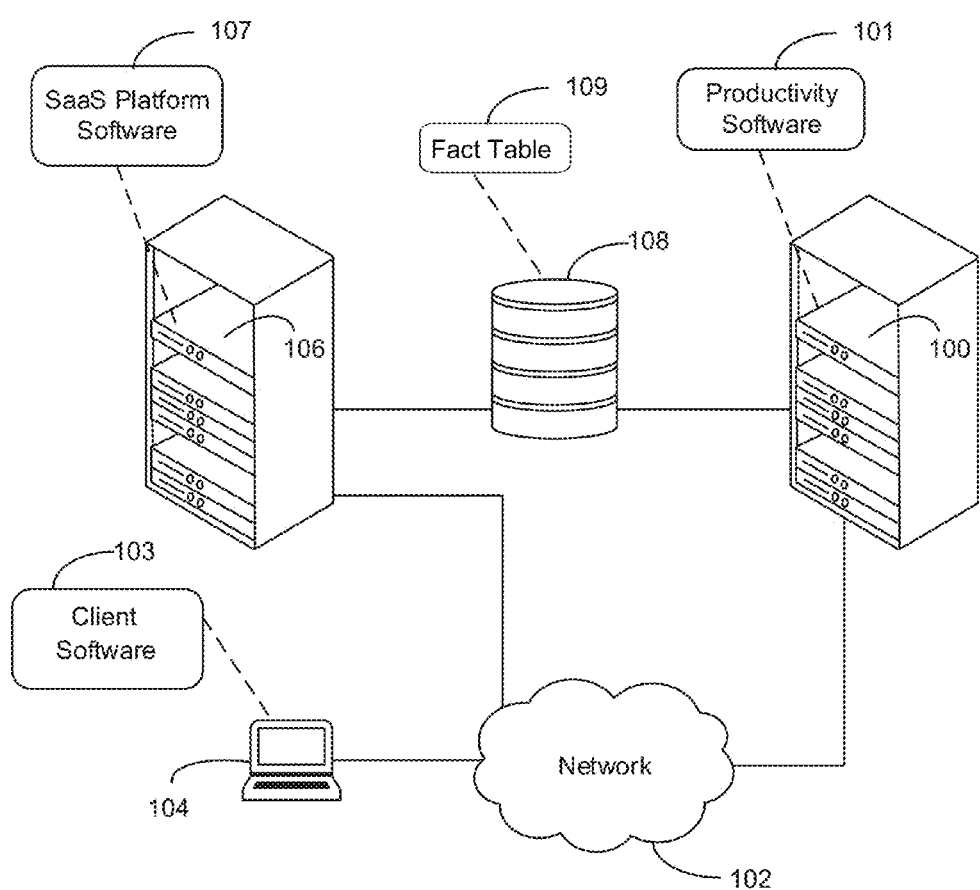
FIG. 1 is a block diagram illustrating an example networking environment in which various embodiments of the disclosure may be employed.

Various embodiments of the disclosure are directed to a system and method for generating markup language to represent a calculation relationship. According to an embodiment, a computing device parses markup language of an instance document (e.g., an XBRL instance document) that contains a plurality of facts, in which each fact comprises a value that is tagged according to at least one concept of a plurality of concepts. A taxonomy document contains markup language that defines one or more relationships among the plurality of concepts. Based on the parsing of the markup language of the instance document, the computing device determines that at least two of the plurality of facts are in a calculation relationship with one another. The computing device then generates markup language (one or more XLink explicit calculation arcs, XBRL formula assertions, or XBRL filters) representing the calculation relationships and modifies the taxonomy document (e.g., modifies or extends a linkbase contained in the taxonomy document) with the generated markup language. In some embodiments, the computing device generates programming code (e.g., Java, Python, or Structured Query Language ("SQL")) instead of markup language and stores the programming code in a taxonomy document or other persistent data structure having the same functionality as a taxonomy document.

In various embodiments, to determine that a calculation relationship exists between the two or more facts, the computing device uses properties of the concepts assigned to the two or more facts, such as the concept period type, the concept balance type, and the concept data type. Additionally, the computing device may use relationships between concepts (e.g., presentation relationships (such as parent-child, sibling, preferred label roles), or definition relationships (such as dimension, dimension domain, and domain member).

In an embodiment, a computing device identifies (e.g., in a document) values (e.g., numerical values) or other human-readable content (e.g., currency symbols, symbols indicating measurement units, text) that are (i) linked to one or more facts, and (ii) demonstrate a pattern that is indicative of a calculation relationship (e.g., stacked vertically above a "total" or referenced by a formula, in the same column of a table, in the same area of a table delineated by a visual border or cell highlights, in the same sentence or paragraph). The computing device then establishes the nature of the calculation relationship—e.g., whether it is more properly characterized as a concept-based relationship or as a fact-based relationship (i.e., not otherwise covered by an existing concept-based relationship).

In an embodiment, the document includes human-readable content and the computing device searches the human-readable content to identify patterns (e.g., looks for arithmetic formulas in the document) indicating that two or more human-readable content items may be in a calculation relationship. The computing device may refer to the facts upon which the content items are based (e.g., the markup language document from which the human-readable content items were drawn). In other words, the computing device uses the formula or formulas and, optionally, the metadata of a taxonomy concerning facts underlying the values referenced by the formulas to determine the calculation relationships among the facts).

In a more specific example, if values are contained in cells of a table (e.g., cells of a spreadsheet or spreadsheet-like table contained in a text document), the computing device may search the table for cells that contain arithmetic formulas and, for each arithmetic formula located as a result of the searching, determine which cells are referenced by the formula, determine which facts correspond to the referenced cells, and generate markup language that represents an arithmetic relationship among the facts corresponding to the referenced cells. The arithmetic relationship represented by the generated markup language is equivalent to the relationship among the cells according to the arithmetic formula.

According to an embodiment, a computing device identifies calculation relationships among facts based on a user selection of values via a user interface. The computing device identifies the facts corresponding to the selected values, generates markup language that represents an arithmetic relationship among the identified facts, and modifies a taxonomy document with the generated markup language.

In an embodiment, a computing device analyzes markup language representing facts and identifies patterns indicating possible calculation relationships among facts based on the metadata (e.g., represented by tags) of those facts. Examples of the kind of metadata the computing device may use to discern a pattern include metadata describing various aspects of the facts within the markup language. Examples of possible aspects of a given fact include the unit of measurement assigned to the fact and the context assigned to the fact. Examples of contexts include the entity to which the fact applies (e.g., the corporation) the time period assigned to the fact (e.g., instant, start date, end date), the scenario or segment assigned to the fact, and other element-value pairs assigned to the fact.

The computing device and method described herein facilitates the representation of calculation relationships currently unsupported by XBRL, and facilitates the validation of XBRL facts within those relationships.

As used herein, a "fact" is a value tagged with a markup language tag representing metadata regarding the value. If the tag is an XBRL tag, the fact will be referred to as an "XBRL fact." In the case of an XBRL fact, one type of metadata that can be represented by an XBRL tag is the "concept" (business concept, such as assets) associated with the fact. Another type of metadata that can be represented by an XBRL tag is a "context." Types of information that a context represents include the organizational entity to which an XBRL fact applies, the period of time for which the XBRL fact is relevant, and an optional "scenario" (represented as dimensional information). For example, a context (expressed, for example, by XBRL tags) might identify an organization by its Central Index Key ("CIK") number as used by the SEC, indicate that the time period for which the fact is relevant is an instant period of time that is as-of Dec. 31, 2015, and that the scenario includes the COUNTRY dimension and a member of the dimension's domain, e.g., CANADA.

An "instance document" is a document containing one or more facts. A "taxonomy document" is a document that contains, in the form of markup language, one or more rules regarding the proper structure and/or interpretation of the instance document.

In the context of XBRL, a taxonomy document can contain (a) an XML schema that provides definitions for the XBRL tags used in an XBRL instance document, (b) a linkbase, or (c) both an XML schema and a linkbase for the instance document. There are typically separate documents for schema and linkbase associated with an instance document. In the context of XBRL, a "linkbase" is a collection of links represented in XLink markup language. A linkbase typically contains markup language describing relationship between concepts. Types of linkbases currently defined in XBRL are a label linkbase, a reference linkbase, a calculation linkbase, a definition linkbase, a presentation linkbase, a formula linkbase, and a table linkbase.

Currently, the XBRL 2.1 specification, (available at <http://www.xbrl.org/Specification/XBRL-2.1/REC-2003-12-31/XBRL-2.1-REC-2003-12-31+corrected-errata-2013-02-20.html>) describes a concept-based calculation relationship, which is a calculation relationship defined using concepts (e.g., Assets, Revenue, etc.) As noted previously, relationships between concepts in XBRL are described in the linkbase.

An XBRL processor can validate XBRL facts using concept-based calculation relationships. The result of this validation is either a confirmation that a fact associated with the concept Assets is "consistent" with the processor-calculated value, or is "inconsistent" with the processor-calculated value. For example, if a calculation relationship is defined between a fact that represents a "total concept" and facts that represent "contributing concept(s)," an XBRL processor, using the calculation relationship (set forth in the linkbase), can compare the computed value to the reported value and thereby validate all of the facts.

In a more specific example, an XBRL taxonomy document may indicate a concept-based calculation relationship asserting that a fact tagged with the concept "Assets" should equal the sum of respective facts associated with concepts "Current Assets" and "Noncurrent Assets." An XBRL 2.1 specification-compliant processor could validate these facts by locating all values tagged as Noncurrent Assets and Current Assets, summing them, and checking to see if the sum equals the value of Assets.

The XBRL 2.1 specification requires that calculation relationships set forth in a linkbase must use facts having the same context and the same unit of measure (e.g., USD, YEN). Thus, one of the shortcomings of XBRL concept-based calculation relationships is that they cannot be used to validate facts across different contexts.

One example of a multiple-context calculation relationship that exists in a financial statement, but cannot be represented in a concept-based calculation relationship, is called a "roll-forward." A roll-forward calculation relationship describes how a measurement at one date is affected by value flow or change over time, e.g., a bank account balance measured as of date1, the deposits/credits and withdrawals/debits that may cause a change in the bank account balance (and occur within the period of time from date1 to date2), and then the ending bank account balance as of date2. Because these facts relate to different dates and different kinds of dates (i.e., a measurement at a moment or "instant" of time, and a measurement over a "duration" of time), an XBRL concept-based calculation relationship cannot be used to validate the facts for this kind of consistency.

Another example related to multiple-contexts is that of scenario or dimensional aggregation. For general information on XBRL dimension, see the XBRL Dimension 1.0 specification, available at <http://www.xbrl.org/Specification/dimensions/REC-2006-09-18/dimensions-REC-2006-09-18+corrected-errata-2012-01-25.html>. Given a dimension for Country, and given domain members of USA, Canada, and Mexico (e.g., the business that is the subject of the report only has revenue from these three countries), there may be a need to test for consistency that a fact reported for the concept Revenue of all countries is consistent with the sum of facts reports for the concept Revenue from the individual members of the Country dimension domain. Concept-based calculation relationships cannot be used to test facts for this kind of consistency.

Another example that cannot be represented in a concept-based calculation relationship is one that crosses different units of measure. For example, units such as ton, pounds, ounces, and kilograms, are members of the class of measure called "mass." Thus, the arithmetic consistency asserted by a domain of facts (e.g., mining industry) and requiring known unit conversion between them (e.g., pounds to kilograms) is not supported by concept-based calculation relationships.

As discussed in more detail below, the various embodiments described herein address these shortcomings by defining calculation relationships among specific XBRL facts instead of XBRL concepts. This allows for the representation of the semantically valid calculation relationships that are unsupported by concept-based calculation relationships and, consequently, validation of facts therein.

Various embodiments of the disclosure are implemented in a computer networking environment. Turning to FIG. 1, an example of such an environment is shown. A first computing device 100 (e.g., a hardware server or a cluster of hardware servers) is communicatively linked to a network 102. Possible implementations of the network 102 include a local-area network, a wide-area network, a private network, a public network (e.g., the Internet), or any combination of these. The network 102 may include both wired and wireless components. Also communicatively linked to the network 102 are a second computing device 104 (e.g., a client device such as a notebook computer, desktop computer, tablet computer, or smartphone) executing client software 103 (e.g., a web browser) and a third computing device 106 (e.g., a hardware server or a cluster of hardware servers). It is to be understood that the various embodiments may be carried out on the first computing device 100, the second computing device 104, or other computing devices not depicted, with the client software 103 being implemented as a thin, web-based client that is able to access the first computing device 100. Furthermore, when the present disclosure describes a "computing device" carrying out an action, it is to be understood that any of the computing devices depicted in FIG. 1 could carry out the action (e.g., the first computing device 100, the second computing device 104 or the third computing device 106) unless otherwise stated.

In an embodiment, the first computing device 100 executes productivity software 101 (e.g., a document editing application, a spreadsheet application, etc.) and the third computing device 106 executes software as a service ("SaaS") platform software 107. The first computing device 100 and the third computing device 106 are communicatively linked to a media storage device 108 (e.g., a memory or a redundant array of independent disks). Although FIG. 1 depicts the media storage device 108 as a single device, in fact, the media storage device 108 may represent a cloud storage service including multiple storage devices. Among the things that may be stored in the media storage device are client documents and data structures that support the activities of the SaaS platform software 107 (such as a fact table 109, which will be discussed in more detail below).

In another embodiment, the productivity software 101 and the SaaS platform software 107 are executed on the same computing device (e.g., the first computing device 100 or the third computing device 106). For example, the productivity software 101 resides on one partition of the first computing device 100 while the SaaS platform software 107 resides on another partition of the first computing device 100. In other embodiments, portions of the productivity software 101 may be executed on both the first computing device 100 and the third computing device 106, and/or portions of the SaaS platform software 107 may be executed on both the first computing device 100 and the third computing device 106. With such network configurations, the second computing device 104 is configured to access the computing device or devices on which the productivity software 101 resides. In an embodiment, the productivity software 101 or the client software 103 (or a combination of both) present, to a user of the second computing device 104, a document viewer and document editor ("document application").

Figure 2:
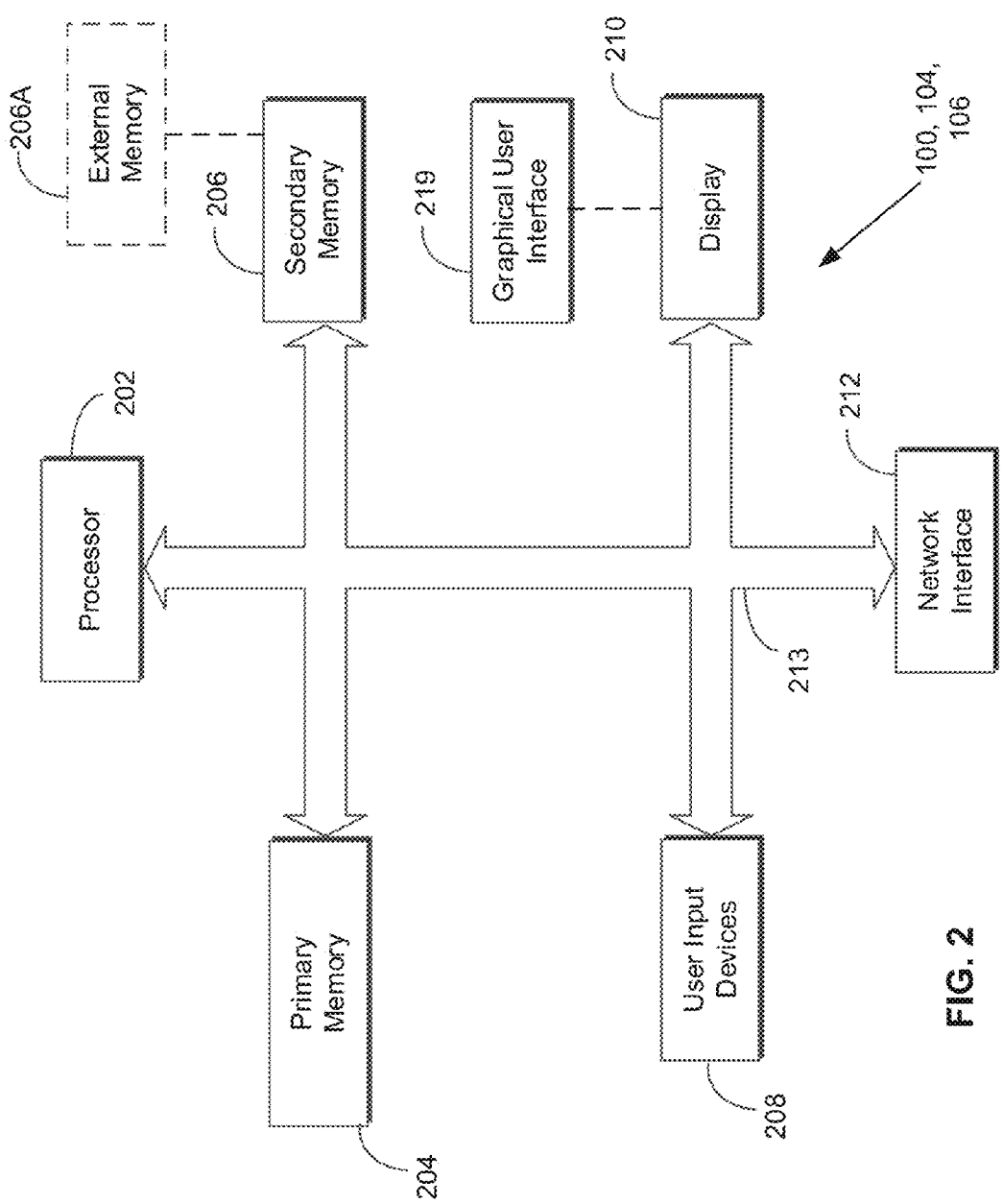
FIG. 2 is a block diagram of a computing device, according to an embodiment.

In one implementation, one or more of the computing devices of FIG. 1 have the general architecture shown in FIG. 2. The computing device includes processor hardware 202 (e.g., a microprocessor, controller, or application-specific integrated circuit) (hereinafter "processor 202"), a primary memory 204 (e.g., volatile memory, random-access memory), a secondary memory 206 (e.g., non-volatile memory), user input devices 208 (e.g., a keyboard, mouse, or touchscreen), a display device 210 (e.g., an organic, light-emitting diode display), and a network interface 212 (which may be wired or wireless). Each of the elements of FIG. 2 is communicatively linked to one or more other elements via one or more data pathways 213. Possible implementations of the data pathways 213 include wires, conductive pathways on a microchip, and wireless connections. In an embodiment, the processor 202 is one of multiple processors in the computing device, each of which is capable of executing a separate thread. In an embodiment, the processor 202 communicates with other processors external to the computing device in order to initiate the execution of different threads on those other processors.

The memories 204 and 206 store instructions executable by the processor 202 and data. In some embodiments, the secondary memory 206 is implemented as, or supplemented by an external memory 206A. The media storage device 108 is a possible implementation of the external memory 206A. The processor 202 executes the instructions and uses the data to carry out various procedures including, in some embodiments, the methods described herein, including displaying a graphical user interface 219. The graphical user interface 219 is, according to one embodiment, software that the processor 202 executes to display a report on the display device 210, and which permits a user to make inputs into the report via the user input devices 208.

In an embodiment, a user can directly edit XBRL code in the document application. In another embodiment, a user can edit values that the productivity software 101 subsequently uses to generate the XBRL code. For example, a user may edit a spreadsheet cell's formula (e.g., "=SUM (B1:B3)"), and the productivity software 101 can use the result of the formula (e.g., the numeric value 290) to create an XBRL fact value. The productivity software 101 then adds the appropriate tags: at least an XBRL concept identifier ("ID") and a time period in the case of a non-numeric XBRL fact. In the case of a numeric fact, the productivity software 100 adds an XBRL concept ID, a time period, a unit of measure, and a numeric precision.

Figure 3:
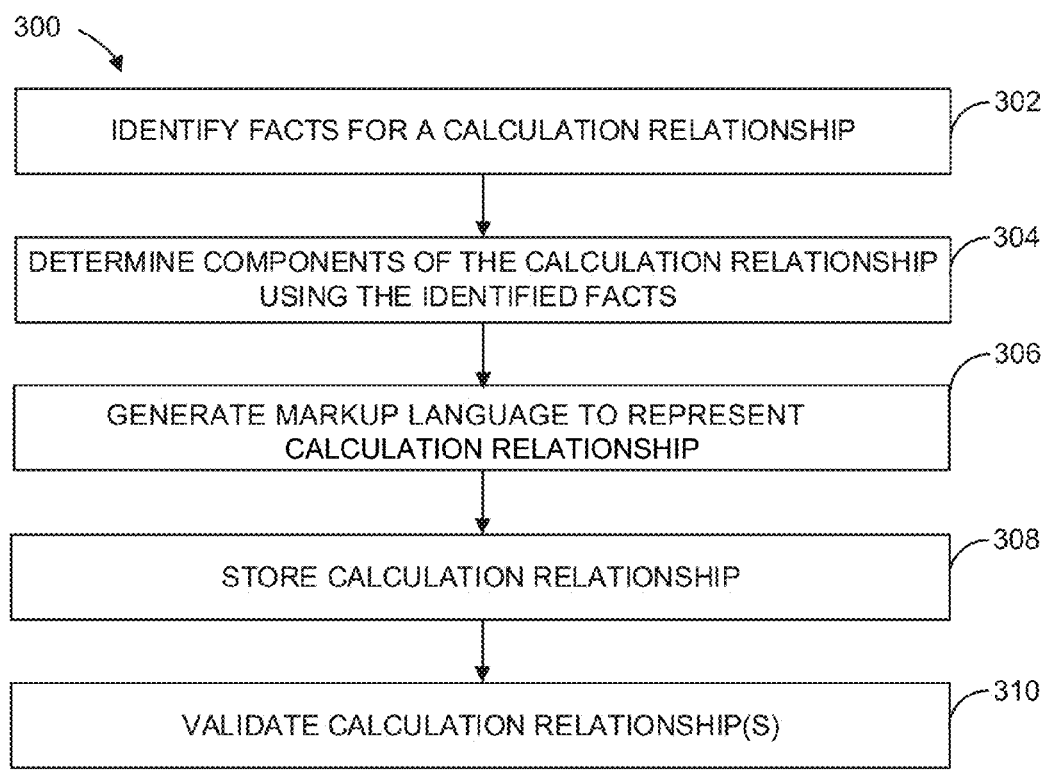
FIG. 3 is a flow chart illustrating a process for determining a calculation relationship, according to an embodiment.

FIG. 3 illustrates a process 300 for generating and validating calculation assertions using XBRL facts, according to an embodiment. In this embodiment, the process 300 is carried out by one or more of the computing devices illustrated in FIGS. 1 and 2. For example, the productivity software 101 carries out the process according to an embodiment. In other embodiments, other suitable computing devices perform the process illustrated in FIG. 3. For ease of description, the steps of the process 300 will described as being carried out by an unspecified computing device.

At block 302, the computing device identifies, from data in a document (e.g., a text document, an XBRL document, or an iXBRL document), and optionally in conjunction with data from an XBRL taxonomy (e.g., a markup language document containing a linkbase), facts that are in a calculation relationship and for which the computing device will generate a calculation assertion (e.g., generate programming code or markup language (e.g., XML, XML according to XLink, including, for example one or more XBRL formula assertions along with one or more filters associated with the one or more formula assertions—to be stored in a formula linkbase) representing the calculation relationship). In an embodiment, the document that the computing device analyzes (in order to identify facts) contains a table (i.e., a spreadsheet document or a word processing document containing a grid having spreadsheet-like functionality). In this embodiment, the computing device automatically identifies XBRL facts that are in a calculation relationship through formulas in the table. For example, the computing device could look for any arithmetic formula whose result constitutes a fact and that references at least one other fact. For example, a cell 'B4' whose content is the formula "=B1+B2−B3" identifies a set of facts with potential for a calculation relationship i.e., cells 'B1', 'B2', 'B3', and 'B4'.

In another embodiment, the computing device analyzes the markup language contents of an XBRL taxonomy document to identify concepts and, ultimately, XBRL facts for a calculation relationship. As one example, the computing device may analyze a presentation linkbase (contained either in a separate linkbase document or in the schema document) and identify XBRL facts that are potentially in a calculation relationship based on the value of the preferred label role attribute assigned to concepts. In another example, the computing device analyzes a table linkbase to identify facts that, for example, are in the same column or same section of a table (as defined, for example, by a visual indicator such as shading or heavier grid lines), as being potential candidates for a calculation relationship.

Figure 9:
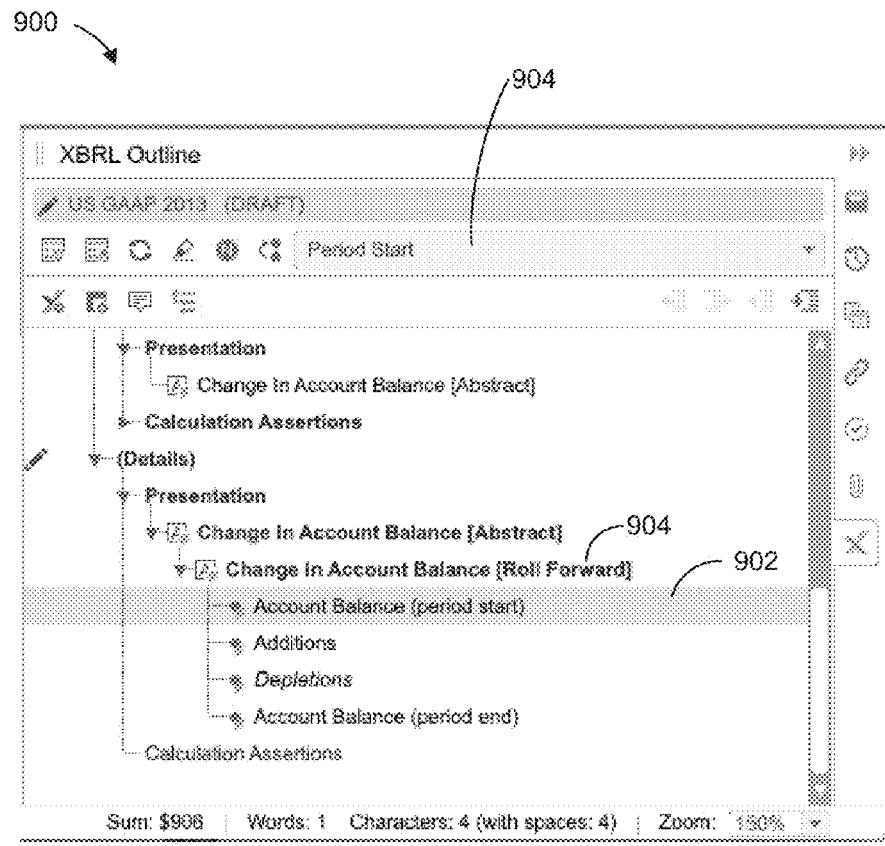
FIG. 9 shows the relationships among various data of a presentation linkbase.

To illustrate, FIG. 9 shows the relationship among various data of a presentation linkbase. The actual linkbase is in XLink format, but what is shown in FIG. 9 is a user interface for a document application that allows viewing and editing of metadata represented in an XBRL taxonomy, including metadata of the presentation linkbase. FIG. 9 presents the concepts in an outline form that mimics the presentation arcs' organization of concepts as parent-child relationships (as described, for example, in the XBRL 2.1, specification, especially example 2 in § 3.5.3.9). Concepts that share the same parent concept are considered siblings. In addition to the preferred label role attribute, above, the presentation arc also may include an attribute that specifies an order or sequence position for the child concept, among other attributes. For example, if the computing device, upon analyzing the linkbase, identifies a concept that has a preferred label role value of "Period Start" or "Period End," the computing device may determine that the concept is the first identified concept participating in a calculation relationship. The computing device determines the specific facts for that relationship by parsing the presentation linkbase to identify all the siblings of that the first identified concept. For the example presented in FIG. 9, it would be all of the sibling concepts from the concept with the preferred label role of "Period Start" to the concept with the preferred label role of "Period End."

In FIG. 9 at entry 902, a concept is highlighted in the user interface. At entry 904 the user interface automatically displays a human-readable representation of the preferred label role for the highlighted concept. In an embodiment, the computing device uses other metadata from the presentation linkbase to confirm this roll-forward arithmetic relationship, e.g., that the concepts with the "Period Start" and "Period End" preferred label role values are of period type instant, and that the other concepts between them in the outline are of period type duration, or that the same concept is used in both starting and ending positions (just with different label roles). In an embodiment, and because XBRL provides for many pre-defined labels roles as well as supporting user-defined label role values, the computing device may use other labels roles or label text to indicate an arithmetic relationship among concepts. For example, if the computing device locates a first identified concept whose preferred label text contains "Roll-Foward" (or other text with a synonymous meaning), the computing device may use this information to identify concepts that exist in the above described roll-forward arithmetic relationship. In this example, the computing device would determine that the children of that first identified concept are all part of the calculation relationship.

In an embodiment, if the computing device locates a concept referenced in a presentation linkbase with the preferred label role value of "Total," the computing device could take this as an indication that the concept may exist in a calculation relationship (e.g., an arithmetic relationship) with other concepts. The computing device may, for example, identify that concept plus the other concepts who share the same presentation parent to be in an arithmetic relationship. In an embodiment other labels' roles and label text may used by the computing device to determine which arithmetic relationship exist among concepts. For example, a preferred label role value of "Product" may indicate that certain concept exist in an arithmetic relationship that represents an arithmetic product. The computing device then uses this determination to identify XBRL facts that are in calculation relationships, generate additional elements of markup language (e.g., XLink XML code), modify the appropriate taxonomy document(s) with the additional elements, and use those additional elements to carry out fact-based validation of the original instance document.

In another embodiment, the computing device parses an XBRL definition linkbase to identify concepts that exist in a dimension-domain arc (as set forth, for example, in the XBRL Dimensions 1.0 specification). In doing so, the computing device identifies facts logically totaled in a dimensional aggregation e.g., a dimension of "Country", and domain members of "USA," "Canada," and "Mexico." More specifically, facts referenced by concepts that are valid primary items of that dimension are candidates for a calculation relationship. As with the previous examples, the computing device uses this calculation relationship to identify XBRL facts that are in a calculation relationship and to extend the linkbase (e.g., modify the linkbase document) with markup language that represents this relationship. The computing device (or some other computing device) may then carry out validation on an instance document using this extended linkbase.

In additional embodiments, the computing device may analyze other XBRL metadata to identify XBRL facts for a calculation assertion, such as label role values, label text, concept name text, concept ID text, data type, presentation linkbase arcs, definition linkbase arcs, and formula linkbase arcs.

In yet another embodiment, the computing device (e.g., running an application that combines document editing with XBRL editing), can use aspects of a document, such as the formatting of the content in the document, to identify XBRL facts for a calculation assertion. For example, the computing device could determine that facts are in a calculation relationship based one or more of the following criteria: the values of the facts are gathered together in a single paragraph, the values of the facts are gathered together in a table or a table column, and the values of the facts are gathered together within a stacked bar chart.

As previously noted, the computing device (in an embodiment) identifies specific facts based on concepts identified through one or more of the methods described above. Since each fact references at least one concept, the computing device can identify those facts associated with the identified concepts. The facts can be further grouped (i.e., determined to be in a calculation relationship) based on sharing the same unit of measure and/or same reporting context. They can further be grouped based on whether or not the facts are valid primary items (as per XBRL Dimensions 1.0 specification, especially § 2.3) in those cases where a dimensional aggregation represents the arithmetic operation.

In another embodiment, a user may identify the XBRL facts for the calculation relationship to the computing device. For example, the user selects via a graphical user interface (and using an input device such as a mouse, keyboard, touchpad, etc.) a cell or a range of cells in a document or spreadsheet table, activates a menu and selects "Arithmetically Group." In another example, the user selects via a graphical user interface concepts from a visual presentation of the XBRL presentation linkbase, calculation linkbase, definition linkbase, table linkbase, or formula linkbase.

Referring back to FIG. 3, at block 304, the computing device determines components of the calculation relationship using the identified XBRL facts. The computing device retrieves the metadata associated with the XBRL facts. For example, the computing device may automatically display the metadata of the cell(s) detected by the computing device or selected by the user. Such metadata includes metadata that may be represented in XBRL e.g., calculation relationship information associated with the selected cell(s).

In an embodiment, the computing device displays a calculation relationship editor. Using the calculation relationship editor, the user can organize into two groups the facts in the selected cell(s), with the cell(s) identified by conventional row and column references. These two reference methods on the same set of facts represent relationships of equivalence, i.e., the result of mathematical operations performed upon the value(s) of the first group is numerically equal to the result of mathematical operations performed upon the value(s) of the second group.

Once the components of the calculation relationship are determined, at block 306, the computing device generates markup language to represent the appropriate calculation relationship, i.e., either a concept-based calculation relationship or a fact-based calculation relationship. In various embodiments, the computing device uses the metadata of the identified facts to determine whether the facts are in the same context. For example, facts in the same context would have to be of the same period type (i.e., instant of time, or duration of time), same period date (e.g., 2015-12-31), and same scenario (e.g., dimension of "Country" and domain member of "USA"). Thus, the computing device could determine that facts fitting these criteria are in the same context.

After the computing device establishes the appropriate calculation relationship and generates markup language representing the calculation relationship, the computing device stores the markup language at block 308 (e.g., in a memory of the computing device or another storage medium in the form of one or more explicit calculation arcs in a calculation linkbase, one or more XBRL formulas assertions and their filters). Then, at block 310, the computing device validates the facts by determining whether the facts reported in the XBRL filing (e.g., in the XBRL instance document) and referenced by the calculation relationship are consistent or inconsistent with the calculation relationship.

Figure 4:
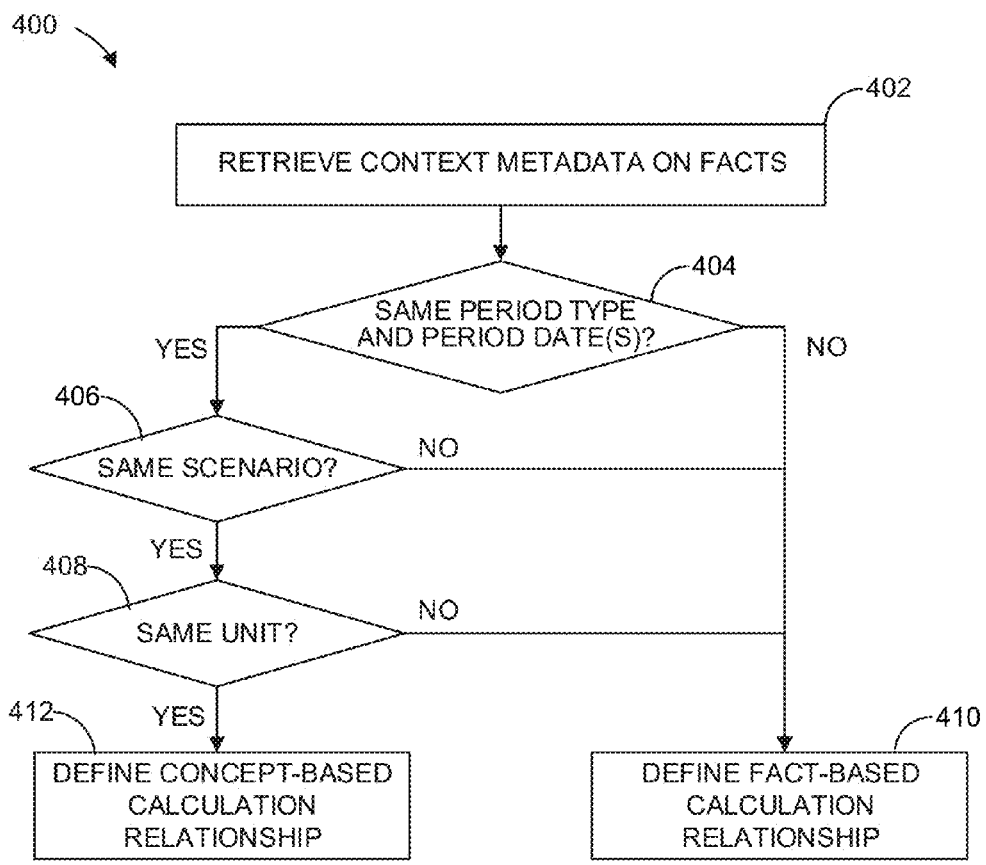
FIG. 4 is a flow chart illustrating a method for determining a calculation relationship, according to another embodiment.

FIG. 4 illustrates a process 400 for determining calculation relationships using XBRL facts, according to an embodiment, and could be carried out by a computing device during the course of carrying out block 306 of FIG. 3. The process 400 is discussed with reference to the computing devices illustrated in FIGS. 1 and 2. In other embodiments, other suitable computing devices can be used to perform the process illustrated in FIG. 4.

At block 402, the computing device retrieves context metadata (e.g., by parsing tags) for facts of an XBRL instance document. At block 404, the computing device determines, using the metadata of the identified XBRL facts, whether the facts have the same period type and period date(s). If the facts have the same period type and the same period date(s) ("YES" following 404), the computing device proceeds to block 406 to determine whether the facts exists in the same scenario (or segment or, more generally whether the facts have equivalent aspects other than period type and period date). If the computing device determines that the facts exist in the same scenario ("YES" following block 406), the computing device then generates or defines a concept-based calculation relationship at block 408 (e.g., by generating additional markup language (e.g., XLink-compliant XML code) and storing the generated markup language in a linkbase in a taxonomy document.

However, if the facts do not have the same period type or do not have the same period date(s) ("NO" following block 404), the computing device generates or defines a fact-based calculation relationship at block 410. Similarly, if the computing device determines that the facts do not exist in the same scenario ("NO" following block 406), the computing device generates a fact-based calculation relationship at block 410. In an embodiment, when the computing device carries out the actions of block 404, it performs the test regarding the period type prior to the test for the same period date, and the if they do not have the same period type the computing device skips the test for the same period date and generates a fact-based calculation relationship at block 410.

Although FIG. 4 depicts block 404 as being carried out before block 406, in other embodiments, the computing device determines whether the XBRL facts exist in the same scenario before determining whether the facts have the same period type and date(s). In other embodiments, the computing device carries out the actions of block 404 and block 406 in the same operation.

For some XBRL facts, the determination of the appropriate type of calculation relationship also depends on whether the facts have the same unit of measure. Accordingly, after the computing device determines that the facts exist in the same scenario in block 406, the computing device determines whether the facts have the same unit of measure at block 408. If the facts have the same unit of measure ("YES" following block 408), then the computing device generates or defines a concept-based calculation relationship at block 412. However, if the computing device determines that the facts do not have the same unit of measure ("NO" following block 408), then the computing device generates a fact-based calculation relationship at block 410.

Although the computing device performs block 404 before block 406 and block 408 in the process 400 of FIG. 4, in other embodiments, the computing device may determine whether the XBRL facts have the same units before determining whether the facts have the same period type and date(s) and/or whether the facts exists in the same scenario. In other embodiments, the computing device carries out any combination of 404, 406, and 408 in a single operation.

In an embodiment, the process 400 of FIG. 4 could include the following operation. If, at block 406, the computing device determines that the XBRL facts do not have the same scenario, the computing device determines whether the facts are on the same axis. If the answer is "YES," then the computing device generates an XBRL formula assertion and its filter(s) (i.e., generates the XLink code representing the formula assertion and its filter(s)). The computing device would then store the formula assertion and its filter(s) in a formula linkbase (i.e., extend the formula linkbase to include the generated code). For example, the computing device could determine whether the facts used the same units, the same period, but different countries (such as in FIGS. 7A-7C). If "YES," then the computing device would generate the XBRL formula assertion and its filter(s) and store it as described above.

Figure 5A:
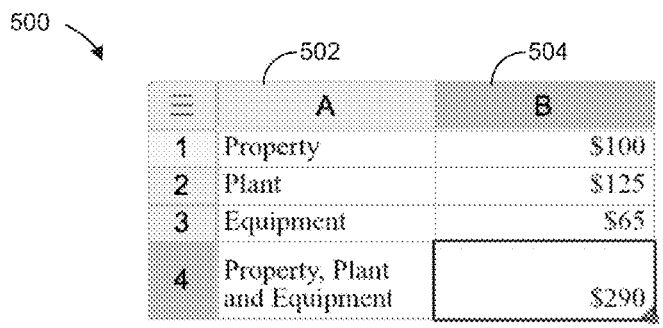
FIG. 5A and FIG. 5B illustrate a report with values based on an example set of facts.
Figure 5B:
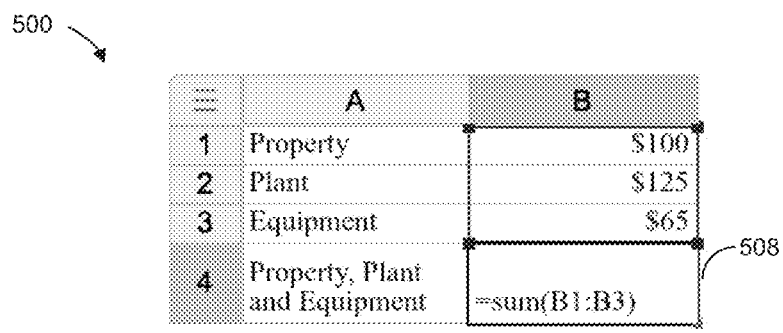
Figure 5C:
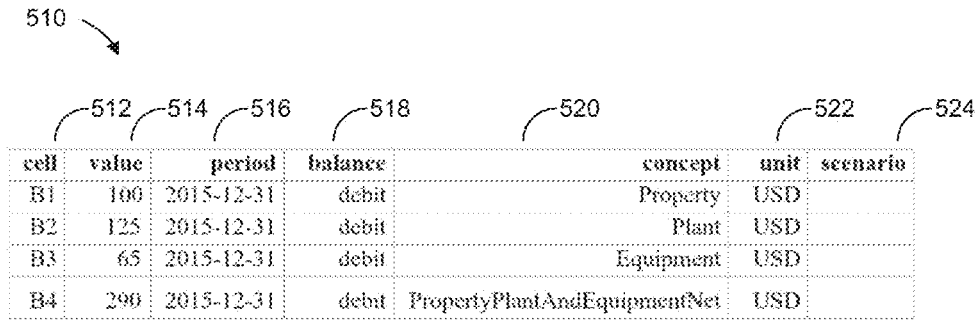
FIG. 5C is a table of the facts represented by the values of the report of FIG. 5A and FIG. 5B.

Referring to FIG. 5A, FIG. 5B, and FIG. 5C, an embodiment of the disclosure will now be described. FIG. 5A depicts a report 500, which contains values presented in tabular form. Column 'A' 502 contains text values that serve as labels for the numeric values in the same respective row of column 'B' 504. FIG. 5B illustrates the same report but with cell 'B4' 508 activated in a user editing mode. FIG. 5B reveals the cell 'B4' 508's value to be a formula that sums the values in the range of cells 'B1' through 'B3'. Although the report 500 may be part of a non-XBRL document (e.g., may be part of a spreadsheet), each of the values in Column 'B' 504 maps to a fact in an XBRL instance document in a way that is known to the computing device. The mapping for this example is depicted in Table 510, shown in FIG. 5C. In an embodiment, when a user selects values in a document or table, such as when the user selects cells 'B1' through 'B4' in the report 500, the computing device responds by retrieving the mappings for the selected values. Table 510 (as well as the tables shown in FIG. 6B and FIG. 7C) may also be referred to herein as a "fact table" because it contains values that support the generation of an XBRL fact or facts. The fact table in this example (and in the remaining examples) is a data structure that is represented by the data structure 109 in FIG. 1. In Table 510, Column 512 contains the location in row and column format that contains a numeric value to quantify as a fact, Column 514 contains the specific values to be quantified as facts, Column 516 contains a period date for the fact in the respective row (in an embodiment, the computing device interprets a single date to indicate an instant period type, and a pair of dates to indicate a duration period type). Column 518 contains the balance type of the concept associated with the fact. Also, in an embodiment, the computing device derives the balance type from metadata associated with the respective concept in the respective row of column 520.

In an embodiment, a computing device carries out the process 300 of FIG. 3 (and the sub-process 400 of FIG. 4) on the data shown in FIG. 5A, FIG. 5B, and FIG. 5C. In particular, the computing device identifies XBRL facts that are in a calculation relationship by scanning the values in the report 500. In one implementation, the computing device determines that two or more values in the table are in a calculation relationship based on (a) whether the values (e.g., the cells in which the values are located) are used in a formula together, and (b) the type of formula. For example, the computing device may determine that there may be a calculation relationship if the cell contains an arithmetic formula, but not come to that determination if the cell only contains a non-arithmetic formula (e.g., a formula that only operates on text). In report 500, the cell 'B4' 508 contains the formula "=sum(B1:B3)", which the computing device would treat as an indication that the fact associated with the cell 'B4' should be tested to determine whether it is consistent with the summation (according to the formula) of the facts associated with cells 'B1', 'B2', and 'B3'. In other words, the XBRL facts shown in Table 510 have been identified by the computing device as components of a calculation relationship.

In various embodiments, the computing device detects other types of arithmetic formulas (i.e., not just those with addition and subtraction operations).

In an embodiment, the computing device is configured to compare the fact properties of period type and period date. The period type (i.e., instant or duration) is a property of the concept with which the fact (e.g., the XBRL fact) is associated. In the example of FIGS. 5A-5C the computing device can determine it by referencing the period type associated with the respective concepts in column 520 of Table 510. In another embodiment, the computing device determines the period type by testing each respective period date in column 516 of Table 510 for a single date value or two date values. A single date value indicates an instant period type, while two date values indicates a duration period type. In another embodiment separate columns each containing a non-overlapping date for the same respective row of the other column also may indicate to the computing device a duration period type. For the facts in Table 510, the period types are the same (i.e., all instant period type) for all of the facts, and the period dates (i.e., 2015-12-31) also are the same. Based on the determination that the facts have the same period type and period dates ("YES" following block 404); the computing device determines whether the facts exist in the same scenario. In FIG. 5C, column 524 of Table 510 shows that the scenario values are null for all the facts, which indicates to the computing device that the facts all exist in the same scenario ("YES" following block 406). Accordingly, using the facts of FIG. 5C, the computing device defines a concept-based calculation relationship, i.e., the fact tagged with the concept PropertyPlantAndEquipment should be consistent with the sum of facts associated with the concepts Property, Plant, and Equipment.

Referring to FIG. 6A and FIG. 6B, another embodiment will now be described. A report 600 contains values presented in tabular form. Column 'C' 602 contains text values that serve as labels for the numeric values in the same respective row of column 'D' 604. Cell 'D4' 606 displays a value of 906. This value is the result of a formula in that cell which totals the values in cells 'D1' through 'D3'. Table 610 (FIG. 6B) is a fact table. In table 610, Column 612 contains the location in row and column format that contains a numeric value to quantify as a fact. Column 614 contains the specific values to be quantified as facts. Column 616 contains a period date for the fact in the respective row. Column 618 contains the balance type of the concept associated with the fact. Column 622 contains values representing the unit of measure for the fact in the respective row. Column 624 contains scenario information for the fact in the respective row.

In an embodiment, the computing device then applies the process 300 of FIG. 3 (and the sub-process 400 of FIG. 4) to the data shown in FIG. 6A and FIG. 6B as follows. The computing device identifies a set of XBRL facts (block 302) by parsing a linkbase associated with the report 600 (e.g., a presentation linkbase (such as graphically illustrated in FIG. 9) or a table linkbase) and comparing the fact properties of period type and period date. As noted previously, a period type (i.e., instant or duration) is a property of a concept with which a fact is tagged. The computing device determines the period type for each concept in column 620 by referencing the corresponding entry in column 616 of Table 610. For the facts in Table 610, the computing device determines that the period types are different (i.e., a mix of duration and instant period types). Based on the determination that the facts do not share the same period type or period dates ("NO" following block 404), the computing device defines a fact-based calculation relationship (block 410). In particular, the computing generates mark up language (e.g., XLink-compliant XML code) that represents the relationship. The computing device then stores the relationship in a taxonomy document (e.g., modifies a linkbase document by adding the generated language) (block 308).

Turning to FIG. 7A, FIG. 7B, and FIG. 7C, an example of how a computing device uses a cell formula to identify a fact-based calculation relationship according to an embodiment will now be described. A report 700 contains values presented in tabular form. Column 'E' 702 contains text values that serve as labels for the numeric values in the same respective row of column 'F' 704. FIG. 7B illustrates the same report 700 with cell 'F4' 708 activated in a user editing mode. The user editing mode reveals the cell 'F4' 708's value as a formula that sums the values in the range of cells 'F1' through 'F3'. Table 710, shown in FIG. 7C, is a fact table. In table 710, Column 712 contains the location in row and column format that contains a numeric value to quantify as a fact. Column 714 contains the specific values to be quantified as facts. Column 716 contains a period date for the fact in the respective row. Column 718 contains the balance type of the concept associated with the fact. Column 722 contains values representing the unit of measure for the fact in the respective row. Column 724 contains scenario information for the fact in the respective row.

The computing device then applies the process 300 of FIG. 3 (and the sub-process 400 of FIG. 4) to the data shown in FIG. 7A, FIG. 7B, and FIG. 7C. The computing device identifies a set of XBRL facts by parsing the values in the report 700. In report 700, the cell 'F4' 708 contains the formula "=sum(F1:F3)." This indicates that the fact associated with cell 'F4' (e.g., the fact as it exists in an XBRL instance document) can be tested (validated) to determine whether it is consistent with the summation of the facts associated with cells 'F1', 'F2', and 'F3'. Thus, the XBRL facts shown in Table 710 have been identified by the computing device as components of a calculation relationship.

After identifying the calculation relationship and its components, the computing device determines the type of calculation relationship using the XBRL facts. In an embodiment, the computing device does so by comparing properties of the facts. For example, the computing device compares the period type and period date. The period type (i.e., instant or duration) is a property of the concept with which the fact is associated, and thus the computing device determines the period type by referring to the appropriate schema (e.g., XBRL schema document). Referring to FIG. 7C, the computing device determines the period type by referencing the period type associated with the respective concepts in column 720 of Table 710. For the facts in Table 710, the period types and the period dates are the same. Based on the determination that the facts do share the same period type or period dates ("YES" following block 404), the computing device determines whether the facts exist in the same scenario. In FIG. 7, column 724 of Table 710 shows that the scenario values are not the same ("NO" following block 406). Accordingly, using the facts of FIG. 7C, the computing device defines a fact-based calculation assertion, generates markup language as previously described, and stores the markup language in a taxonomy document as previously described.

FIG. 8 shows XBRL code that implements one possible syntactical approach for representing a fact-based calculation relationship within a linkbase document, according to an embodiment. The specific facts themselves would be in an instance document. The fact-based calculation relationship references the relevant facts through each fact's ID, which would also be stored in the instance document. The type of arithmetic operation to be performed by a software application that would consume the code s specified in the arc as "explicitCalculationArc" though other implementations may use alternative text.

Figure 12:
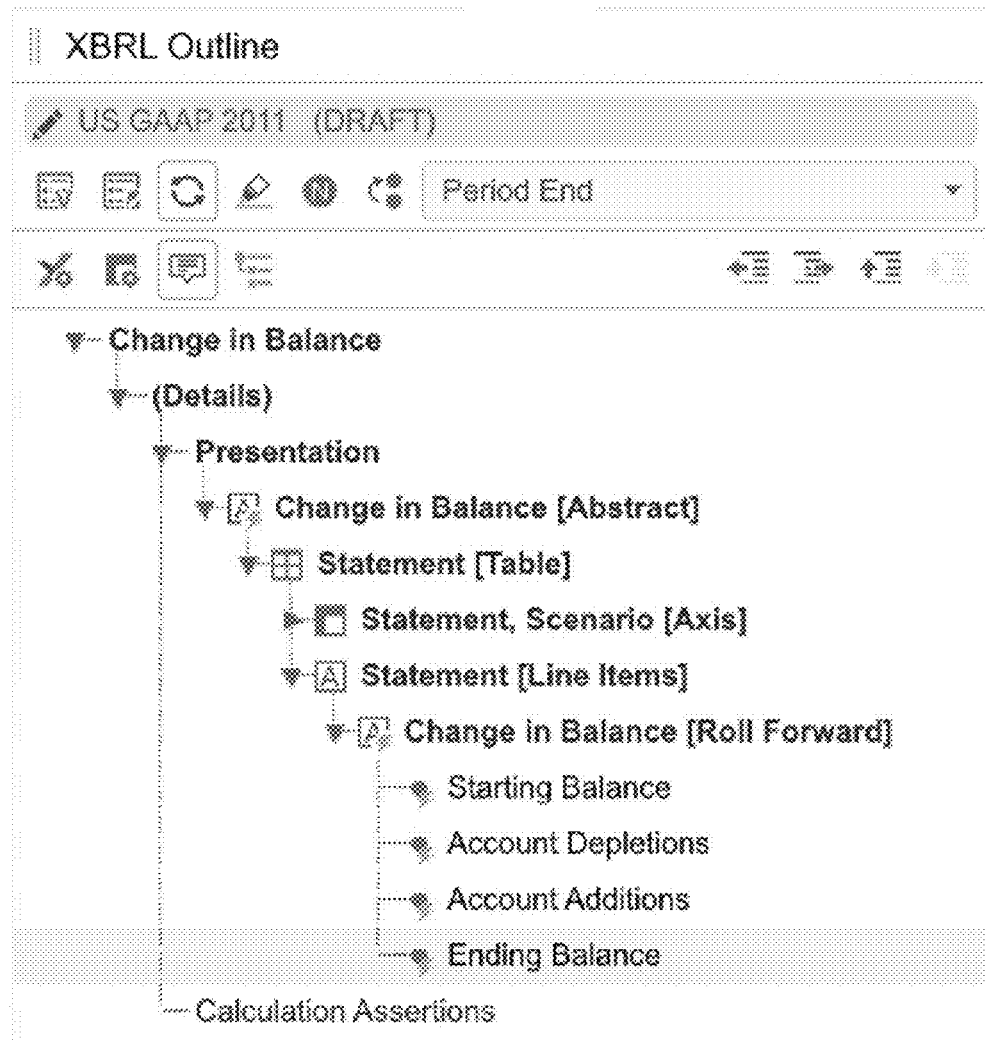
FIG. 12 depicts the relationships among the facts of FIG. 10 as set forth in the taxonomy document of FIG. 11.

FIG. 10 shows an example of an instance document, from which the values shown in the report 600 of FIG. 6A were derived. FIG. 11 shows a taxonomy document containing a linkbase 1100. In this example, there is a set of facts (e.g., XBRL facts) whose values are depicted in cells D1, D2, D2, and D4 of FIG. 6A, which are shown in the instance document of FIG. 10 as "Fact-0001," "Fact-0002," "Fact-0003," and "Fact-0004," respectively. A computing device, using one or more of the techniques described herein, identifies a calculation relationship among D1, D2, D3, and D4. The computing device then generates markup language code 1102*a* and 1102*b* that it stores in the linkbase 1100, shown in FIG. 11. The markup language code 1102*b* indicates that there is a set of explicit calculation arcs showing that the sum of D1, D2, and D3 (with D3 having a weight of −1, indicating a subtraction operation) yields D4. The markup language code 1102*a* includes locators to the facts. FIG. 12 depicts the relationships among these facts in outline form (e.g., in an XBRL viewer/editor application running on the second computing device 104).

It should be understood that the exemplary embodiments described herein should be considered in a descriptive sense only and not for purposes of limitation. Descriptions of features or aspects within each embodiment should typically be considered as available for other similar features or aspects in other embodiments. It will be understood by those of ordinary skill in the art that various changes in form and details may be made therein without departing from their spirit and scope. For example, the steps of the various flow charts can be reordered in ways that will be apparent to those of skill in the art. Furthermore, the steps of these flowcharts as well as the methods described herein may all be carried out on a single computing device.

What is claimed is:

1. A method for generating markup language to represent a calculation relationship among a plurality of facts, the method carried out by one or more computing devices, the method comprising:
    parsing markup language of an extensible business reporting language (XBRL) instance document containing the plurality of facts, wherein
        each fact comprises a value tagged with XBRL tags according to one of a plurality of XBRL concepts,
        one or more relationships among the plurality of XBRL concepts is defined by markup language contained in a taxonomy document;
    based on the parsing,
        determining that at least two facts of the plurality have the same XBRL period type and XBRL period date,
        determining that the at least two facts have different XBRL scenarios;
    based on the determination that the at least two facts have the same XBRL period type and same XBRL period date but have different XBRL scenarios, defining a fact-based calculation relationship between the at least two facts;
    generating markup language that represents the defined calculation relationship; and
    modifying the taxonomy document with the generated markup language.

2. The method of claim 1, further comprising:
    parsing the markup language of the taxonomy document to identify a concept element having a preferred label role value indicating that facts associated with the concept are in a calculation relationship,
    wherein parsing the markup language of the instance document comprises parsing the markup language of the instance document to identify facts tagged with the identified concept.

3. The method of claim 2, wherein
    the value of the preferred label role represents a period start or a period end; and
    the calculation relationship is a roll-forward arithmetic relationship.

4. The method of claim 2, further comprising:
    retrieving context metadata for the at least two of the plurality of facts;
    determining that the at least two facts have different XBRL scenarios based on the retrieved context information.

5. The method of claim 1, wherein the calculation relationship is an arithmetic relationship in which one of the plurality of facts is a result of an arithmetic operation on the other facts of the plurality of facts, the method further comprising:
    analyzing the markup language of the instance document to verify that each occurrence of said one fact in the instance document is the correct result of the arithmetic operation.

6. A computing device configured to carry out the method of claim 1.

7. A non-transitory computer-readable medium having stored thereon computer-executable instructions for carrying out the method of claim 1.

8. A method for generating markup language to represent a calculation relationship among a plurality of facts, the method carried out by one or more computing devices, the method comprising:
    parsing markup language of an extensible business reporting language (XBRL) instance document containing the plurality of facts, wherein
        each fact comprises a value tagged with XBRL tags according to one of a plurality of XBRL concepts,
        one or more relationships among the plurality of XBRL concepts is defined by markup language contained in a taxonomy document;
    based on the parsing,
        determining that at least two facts of the plurality have the same XBRL period type and XBRL period date,
        determining that the at least two facts have different units of measure;
    based on the determination that the at least two facts have the same XBRL period type and same XBRL period date but have different units of measure, defining a fact-based calculation relationship between the at least two facts;

generating markup language that represents the defined calculation relationship; and modifying the taxonomy document with the generated markup language.

9. The method of claim 8, further comprising:

parsing the markup language of the taxonomy document to identify a concept element having a preferred label role value indicating that facts associated with the concept are in a calculation relationship, wherein parsing the markup language of the instance document comprises parsing the markup language of the instance document to identify facts tagged with the identified concept.

10. The method of claim 9, wherein the value of the preferred label role represents a period start or a period end; and the calculation relationship is a roll-forward arithmetic relationship.

11. The method of claim 9, further comprising:

retrieving context metadata for the at least two of the plurality of facts;

determining that the at least two facts have different units of measure based on the retrieved context information.

12. The method of claim 8, wherein the calculation relationship is an arithmetic relationship in which one of the plurality of facts is a result of an arithmetic operation on the other facts of the plurality of facts, the method further comprising:

analyzing the markup language of the instance document to verify that each occurrence of said one fact in the instance document is the correct result of the arithmetic operation.

13. A computing device configured to carry out the method of claim 8.

14. A non-transitory computer-readable medium having stored thereon computer-executable instructions for carrying out the method of claim 8.

15. The method of claim 8, wherein determining that the at least two facts have different units of measure comprises determining that the at least two facts have different units of currency.

16. The method of claim 8, wherein determining that the at least two facts have different units of measure comprises determining that the at least two facts have different units of mass.

17. A method for generating markup language to represent a calculation relationship among a plurality of facts, the method carried out by one or more computing devices, the method comprising:

parsing markup language of an extensible business reporting language (XBRL) instance document containing the plurality of facts, wherein each fact comprises a value tagged with one or more XBRL tags according to one of a plurality of XBRL concepts, one or more relationships among the plurality of XBRL concepts is defined by markup language contained in a taxonomy document;

based on the parsing, determining that at least two facts of the plurality have the same XBRL period type but different XBRL period dates, based on the determination that the at least two facts have the same XBRL period type but different XBRL period dates, defining a fact-based calculation relationship between the at least two facts;

generating markup language that represents the defined calculation relationship; and modifying the taxonomy document with the generated markup language.

18. The method of claim 17, further comprising:

parsing the markup language of the taxonomy document to identify a concept element having a preferred label role value indicating that facts associated with the concept are in a calculation relationship, wherein parsing the markup language of the instance document comprises parsing the markup language of the instance document to identify facts tagged with the identified concept.

19. The method of claim 18, wherein the value of the preferred label role represents a period start or a period end; and the calculation relationship is a roll-forward arithmetic relationship.

20. The method of claim 18, further comprising:

retrieving context metadata for the at least two of the plurality of facts;

determining that the at least two facts have different XBRL period dates based on the retrieved context information.

21. The method of claim 17, wherein the calculation relationship is an arithmetic relationship in which one of the plurality of facts is a result of an arithmetic operation on the other facts of the plurality of facts, the method further comprising:

analyzing the markup language of the instance document to verify that each occurrence of said one fact in the instance document is the correct result of the arithmetic operation.

22. A computing device configured to carry out the method of claim 17.

23. A non-transitory computer-readable medium having stored thereon computer-executable instructions for carrying out the method of claim 17.

24. The method of claim 17, wherein determining that at least two facts of the plurality have the same XBRL period type but different XBRL period dates comprises determining that the at least two facts are both XBRL instant period types but have different period dates.

25. The method of claim 17, wherein determining that at least two facts of the plurality have the same XBRL period type but different XBRL period dates comprises determining that the at least two facts are both duration period types but have different XBRL period start or different XBRL period end dates.

* * * * *